United States Patent [19]

Kinnanen

[11] Patent Number: 5,286,077
[45] Date of Patent: Feb. 15, 1994

[54] TOP MECHANISM FOR THE RETRACTABLE TOP OF AN OPEN AUTOMOBILE

[75] Inventor: Matti Kinnanen, Uusikaupunki, Finland

[73] Assignee: Oy Saab-Valmet AB, Vusikanpunki, Finland

[21] Appl. No.: 8,489

[22] Filed: Jan. 25, 1993

[30] Foreign Application Priority Data

Mar. 5, 1992 [FI] Finland .................. 920983

[51] Int. Cl.$^5$ .............................. B60J 7/08
[52] U.S. Cl. ...................... 296/107; 296/122
[58] Field of Search ........... 296/107, 116, 121, 122

[56] References Cited

U.S. PATENT DOCUMENTS

| | | | |
|---|---|---|---|
| 3,036,859 | 5/1962 | Adamski | 296/116 |
| 4,840,421 | 6/1989 | Hennessy | 296/107 X |
| 4,854,634 | 8/1989 | Shiraishi et al. | 296/122 X |
| 5,026,110 | 6/1991 | Koop et al. | 296/122 X |

FOREIGN PATENT DOCUMENTS

| | | |
|---|---|---|
| 667662 | 7/1963 | Canada .................. 296/116 |
| 0400376 | 5/1990 | European Pat. Off. . |
| 3809197 | 9/1989 | Fed. Rep. of Germany . |
| 4004871 | 8/1991 | Fed. Rep. of Germany . |

*Primary Examiner*—David M. Mitchell
*Assistant Examiner*—Gary C. Hoge
*Attorney, Agent, or Firm*—Merchant, Gould, Smith, Edell, Welter & Schmidt

[57] ABSTRACT

A mechanism for the retractable top of an open automobile, comprising a plurality of frame elements (1,2) pivoted one after the other to be turnable relative to each other, the frame elements (1,2) comprising a first frame element (1) which is the foremost frame element on the free end of the top and a second frame element (2) which is the frame element adjacent to the first frame element. The first frame element (1) comprises a pair of first side rods (51), which are substantially longitudinal to the vehicle, and the second frame element (2) comprising a pair of second side rods (52), which are substantially longitudinal to the vehicle, and the side rods (51,52) being disposed to be turnable relative to each other in a vertical plane. The top mechanism further comprises an operating rod (7) arranged to cause the turning of the first side rod relative to the second side rod in connection with the processes of stretching the top mechanism over and of folding it up. The first side rod (51) and the second side rod (52) are connected to each other by means of a quadrangular linkage composed of two crank levers (8,9) of different lengths, and that the operating rod (7) is turnably pivoted to a crank lever (8), whereby the first side rod is turnable in completely controlled manner relative to the second side rod, throughout the turning movement.

10 Claims, 2 Drawing Sheets

TOP MECHANISM FOR THE RETRACTABLE TOP OF AN OPEN AUTOMOBILE

The object of the present invention is a car top mechanism as defined in the preamble to Claim 1.

BACKGROUND OF THE INVENTION

Through the state of art is known a top mechanism for the retractable top of an open automobile comprising a plurality of frame elements pivoted one after the other to be turnable relative to each other and which fold up outside the passenger space of the car and, on the other hand, can be stretched out over said passenger space. Said frame elements comprise a first frame element which is the foremost frame element on the free end of the top and which in the situation in which the top is extended over the car rests against a part belonging to the frame of the vehicle, such as the windshield beam. Furthermore, the frame elements include a second frame element, which is the frame element immediately adjacent to the first frame element. To the first frame element belongs a pair of first side rods, which are substantially longitudinal to the vehicle, on the side margin of the top. To the second frame element belongs, similarly, a pair of second side rods, which also are substantially longitudinal to the vehicle. The first and second side rods are arranged to be turnable relative to each other in a vertical plane. The top mechanism further comprises an operating rod, disposed to effect said turning of the first side rod in connection with the operation of extending, and folding up, the top mechanism. Top mechanisms of this type are known, for instance, through the references EP 0 400 376, DE 40 04 871, and DE 38 09 197.

The problem with top mechanisms known in the art is that when the first and second side rods have been extended into stretched-out position, in which they are end to end in relation to each other, the distance between the pivot point of the operating rod and the pivot point between the first and the second side rod, provided to enable their turning, i.e., the moment arm, becomes exceedingly short, thus considerably impeding control of the stretch-out turning motion in its ultimate stage as well as the corresponding motion at the beginning of the fold-up operation. The pivots and the rods are subject to major forces in these instances, inasmuch as the weight of the first frame element may be 10 kg and even more and the moment arm at disposal in order to effect its turning is almost nil. Moreover, owing to poor control of the turning of the foremost frame element in the ultimate phase of the stretch-on movement it is a frequent occurrence that the first top rib hits against the windshield beam (known as the slamming phenomenon), whereby undesirable pressure peaks are induced in the hydraulics operating the car top mechanism. This is disadvantageous from the user's viewpoint as well as that of the mechanism.

A further problem encountered in car top mechanisms of prior art is that when the top is in open position, that is, folded up, the end of the first side rod coincides in position with the end of the second side rod, in other words, the ends are in register because of the pivoting and they form an acute angle deviating grossly from the horizontal line; this sharp point may introduce a safety hazard in the event of collision with another vehicle. At the same time, the ends of the side rods lying one upon the other constitute a space-consuming structure. When the top is in retracted position, this structure must be covered with a protective cover, the configuration of which will, for the above reason, present a tall and unattractive structure standing out from the lines of the car body.

SUMMARY OF THE INVENTION

The object of the invention is to eliminate the drawbacks just discussed.

It is a particular object of the invention, to provide a car top mechanism by the aid of which the turning motion of the foremost frame element is rendered completely smooth and tranquil, throughout the turning operation.

It is furthermore an object of the invention, to provide a car top mechanism enabling such operation that when the top is in its open position, or folded up, the end of the first side rod is offset rearward in relation to the end of the second side rod, in other words, said ends are not in register, whereby added space is gained in the rear.

The top mechanism of the invention is characterized by that which is stated in the appended claims.

As taught by the invention, the first side rod and second side rod are connected to each other by means of a linkage consisting of two crank levers of different lengths, and the operating rod is turnably pivoted to the crank lever, whereby the first side rod is turnable relative to the second side rod in completely controlled manner throughout the turning motion. The operating rod being connected to the first crank lever of the linkage, the lever effect results in a turning torque rather much higher than in the conventional design, in other words, the mechanism presents more favourable lever ratios.

In an embodiment of the top mechanism, the linkage consists of a frame component, defined by the straight line connecting the crank lever pivot points on the second side rod, in relation to which rotation of the crank levers of the linkage and of the first side rod has been arranged to take place; of the first crank lever and the second crank lever, the ends of both being turnably pivoted on the first side rod and on the second side rod, respectively; and of a turning component defined by the straight line connecting the crank lever pivot points on the first side rod; and the operating rod is pivoted to the first crank rod at a point which is triangularly located at a distance from the pivot points of the ends of the first crank lever and at a distance from the straight line connecting said pivot points.

In an embodiment of the top mechanism, the length of the second crank lever is less than the length of the first crank lever.

In an embodiment of the top mechanism, the length of the frame component is nearly equal to or smaller than the length of the turning component, which is less than the length of the second crank lever.

In an embodiment of the top mechanism, the linkage mechanism is a double rocker/pivoted quadrangle linkage mechanism. The end points of the crank levers will then move on delimited circular arcs.

In an embodiment of the top mechanism, the mechanism comprises stop members for delimiting the angular movement of the first side rod, relative to the second side rod in the extreme turning positions.

In an embodiment of the top mechanism, the stop members comprise abutment surfaces on those ends of the first side rod and the second side rod which come into abutment.

In an embodiment of the top mechanism, the configurations of the abutment faces are adapted to be mutually consistent.

In an embodiment of the top mechanism, the mechanism comprises an adjustment member disposed to regulate the mutual position of the abutment faces relative to each other.

In an embodiment of the top mechanism, the abutment surfaces are oblique.

The advantage of the invention is that the turning motion of the first top rib will be completely uniform and controlled all through the turning event, and the disadvantageous slamming effect is avoided.

It is a further advantage of the invention that the top mechanism makes possible a situation in which, with the car top in its open position, or folded up, the end of the first side rod is slightly rearward offset relative to the end of the second side rod, i.e., the ends are not in register, whereby added space is gained in the rear of the vehicle.

BRIEF DESCRIPTION OF THE DRAWINGS

In the following, the invention is described in detail with reference being made to the attached drawing, wherein.

DETAILED DESCRIPTION OF THE PREFERRED EMBODIMENT

Figure 1:
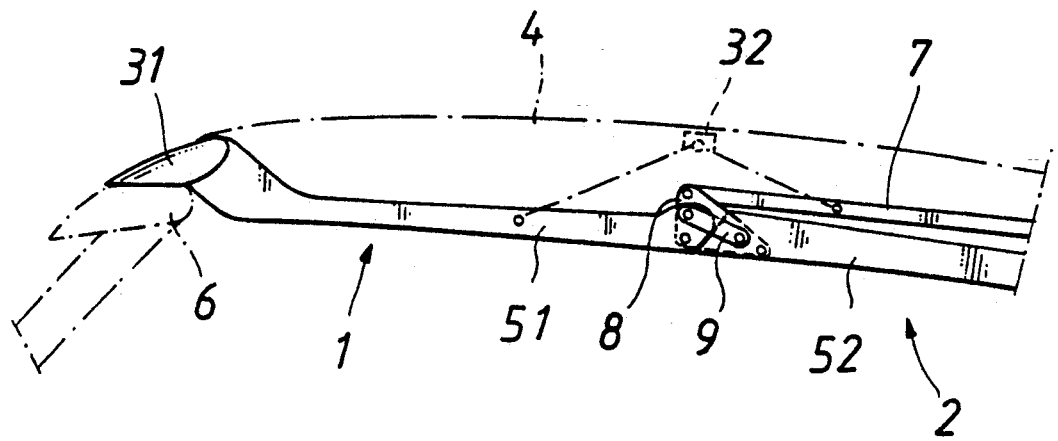
FIG. 1 presents, schematically and in part, an embodiment of the car top mechanism of the invention, in extended condition.

FIG. 1 depicts the front part of the top mechanism of the retractable top of an open automobile, schematically in elevational view. The top mechanism comprises frame elements 1,2 which are pivoted to be turnable in relation to each other, of these being visible in the figure the two foremost frame elements 1 and 2, which are in the figure stretched out to be parallel to each other. The frame elements 1,2, as well as the other elements belonging to the mechanism, are in a manner typical of the retractable top of an open car, foldable together on the sides and behind the passenger space, as has been schematically shown in FIG. 2, and they are on the other hand extendable to stretch over the passenger space, as illustrated in FIG. 1. Connected to the frame elements 1 and 2 are transversal top ribs 31,32, on which the top fabric 4 will be tautly stretched when the top mechanism is in the position in which the top is extended over the passenger space. On the foremost, first frame element 1, the first roof rib 31 comes to lie against the windshield beam 6 when the top is stretched over, and it can become locked to said beam with particular locking members. First side rods 51 are provided to be turnable relative to the second side rods 52 of the adjacent, second frame element 2 so that when the top is in retracted condition, that is in folded-up condition (FIG. 2), the first side rods 51 are turned to be superimposed and substantially parallel relative to the second side rods 52, and when the top is closed, or in stretched-over position (FIG. 1), the first side rods 51 are turned end to end in relation to the second side rods 52. The top mechanism further comprises an operating rod 7 producing the turning motion, for turning the first side rod 51 relative to the second side rod 52. A top mechanism of this type is operated in conventional manner e.g. with the aid of a hydraulic power means, which has not been depicted in the present instance.

Figure 3:
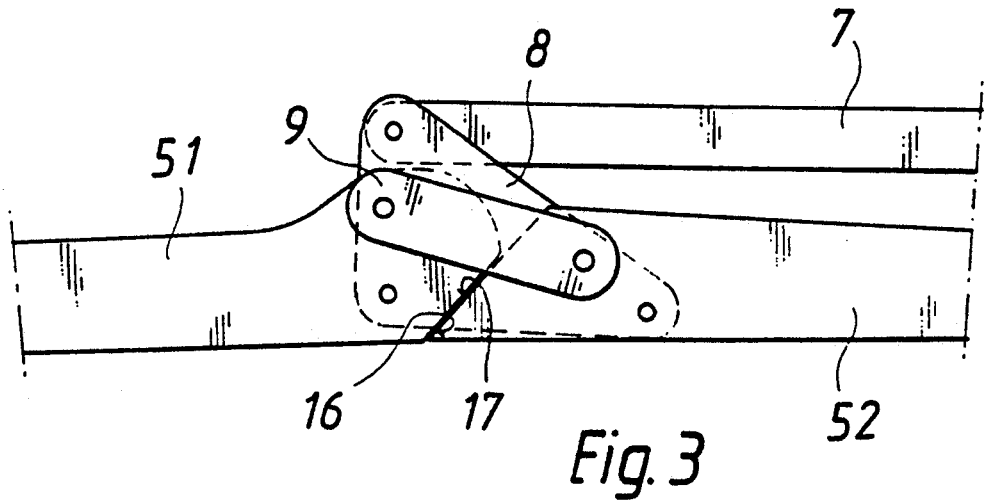
FIG. 3 presents, enlarged, a detail of the car top mechanism of FIG. 1, in extended condition.

In FIG. 3 the pivot point between the first side rod 51 and the second side rod 52 is shown, enlarged. As the figure reveals, the first side rod 51 and the second side rod 52 are not directly pivoted on each other; they are instead interconnected by a linkage consisting of two crank levers 8,9 with different lengths. The first crank lever 8 has the shape of a triangular plate, and it is larger than the second crank lever 9. The operating rod 7 is turnably pivoted to the first crank lever 8, whereby the operating rod 7 carries the driving power to the linkage. The operating rod 7, in turn, is connected with the rest of the linkage provided for the top mechanism in a manner known in the art, which is not described here. It is thus understood that the first crank lever 8 serves as driving lever and the second crank lever 9 serves as guiding lever. By the aid of this quadrangle linkage design, constituting a closed, positive-motion kinematic chain, the turning motion of the first side rod 51 in relation to the second side rod 52 will thus be completely controlled, and tranquil, and there will for instance be no bump whatsoever against the windshield beam 6 when the top is being closed, since the moment arm of the mechanism cannot become excessively small at any stage of the turning process.

Figure 4:
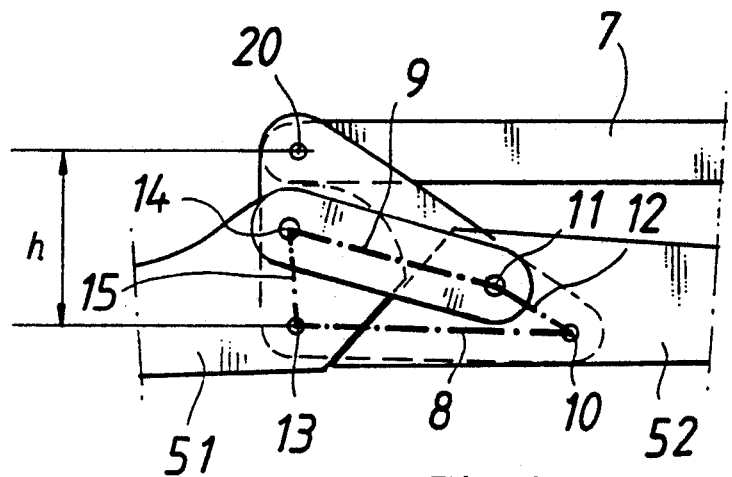
FIG. 4 shows, further enlarged, a detail of FIG. 3.

FIG. 4 shows the same detail as FIG. 3, but somewhat enlarged. The figure illustrates, drawn with heavy dot-and-dash lines, the above-discussed linkage, which is formed by a body component 12, fixedly attached to the second side rod 52, a first crank lever 8, a second crank lever 9, and a turning component 15 attached to the first side rod 51. The fixed body component 12, relative to which the turning takes place, is defined through the pivot points 10,11 of the crank levers 8,9. The ends of the first crank lever 8 are turnably pivoted, to the first side rod 51 at the pivot point 13, and to the second side rod 52 at the pivot point 10. Similarly, the ends of the second crank lever 9 are turnably pivoted, to the first side rod 51 at the pivot point 14, and to the second side rod 52 at the pivot point 11. The turning component of the linkage, 15, to which the first side rod 51 is fixedly connected, is defined through the pivot points 13 and 14 of the crank levers 8 and 9. It is further apparent in the figure that the operating rod 7 is pivotally attached to the first crank lever 51 at the pivot point 20, which is located in triangle configuration in relation to the pivot points 10,13 on the ends of the first crank lever and located at a distance h from the line connecting these pivot points 10 and 13. The dimensions of the pivot point intervals have here been chosen so that the length of the second crank lever 9 is less than that of the first crank lever 8. The length of the body component 12 is nearly equal to, or less than, the length of the turning component 15, which in turn is less than the length of the second crank lever 9. With proportions like this, the quadrangular linkage will be a twin pendulum linkage, in other words, the crank levers 8,9 do not describe a full circle; they merely oscillate through a limited circular arc. This is fully adequate since they are not even required to describe a full circle.

Figure 2:
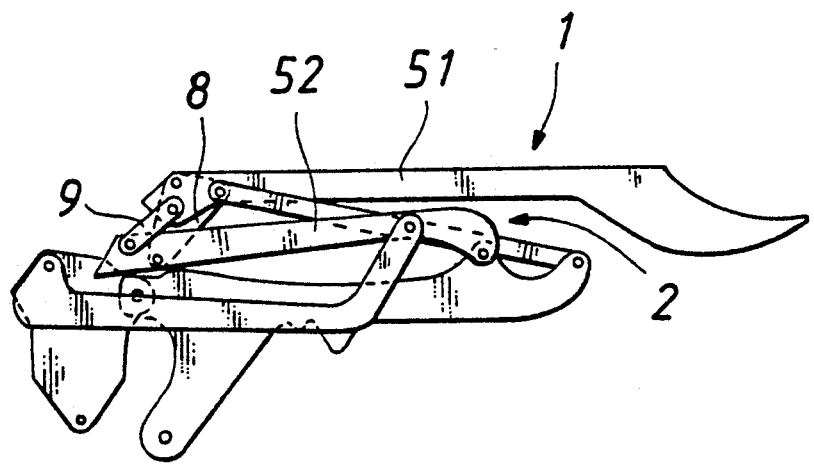
FIG. 2 shows the embodiment of FIG. 1 after it has been folded.
Figure 5:
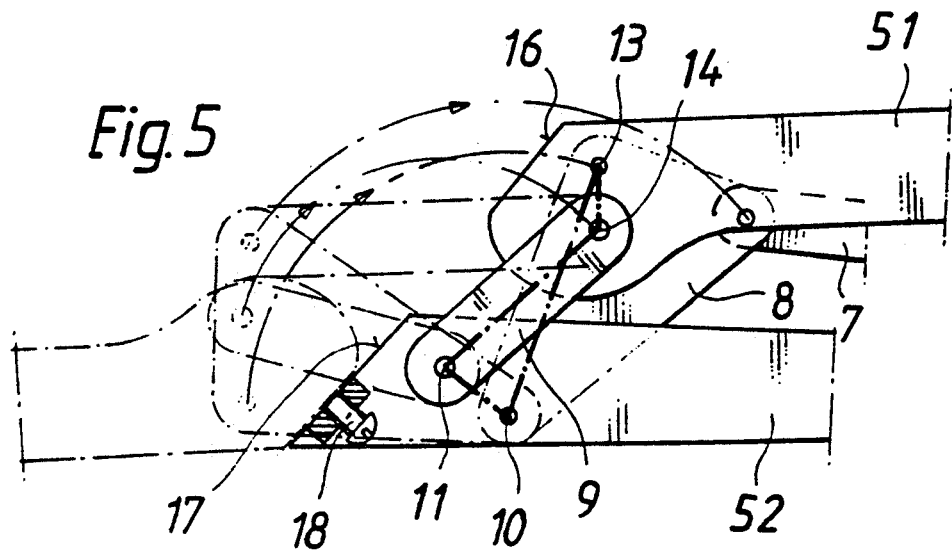
FIG. 5 shows, enlarged, a detail of the car top mechanism of FIG. 1, in extended as well as folded-up position.

In FIG. 5, the mechanism of FIGS. 3 and 4 has been turned from the position indicated with thin dot-and-dash lines, to the folded position, corresponding to FIG. 2, in which the first side rod 51 lies parallel over the second side rod, thereabove, and the end of the first side rod 51 is displaced, under guidance by the linkage mechanism, toward the right in the figure, relative to the end of the second side rod 52. The end position of the linkage mechanism has also been illustrated in the figure, using heavy dot-and-dash lines.

It is seen in FIGS. 3 to 5 that the mechanism includes stop members 16,17 for delimiting the angular motion of the first side rod 51 relative to the second side rod 52. These stop members 16,17 consist of abutment faces on the ends of the first side rod 51 and the second side rod 52 which come together. The bevelled configurations of the abutment faces 16,17 have been disposed to mate. FIG. 5 moreover reveals that the mechanism comprises an adjustment member 18, in the present instance a screw, which has been screwed into a nut component affixed on the end of one side rod 52. Rotation of this screw will cause its end to push against the end face 16 of the first side rod 51, and it thus becomes possible to adjust the angle of the first side rod 51 in relation to the second side rod 52 if this angle should deviate from what is desired, owing to increasing looseness or any other cause.

The invention is not confined to concern merely the embodiment examples presented in the foregoing: numerous modifications are feasible without departing from within the scope of the inventive idea defined by the claims.

I claim:

1. A mechanism for the retractable top of an open automobile, the top having a free end, comprising a plurality of frame elements (1,2) pivoted one after the other to be turnable relative to each other and being foldable together outside the passenger space and, on the other hand, stretchable out over the passenger space, and said frame elements (1,2) comprising a first frame element (1) which is the foremost frame element on the free end of the top and which, when the top is in stretched-over position, rests against a part (6) belonging to the vehicle proximate a windshield beam, and a second frame element (2) which is the frame element adjacent to said first frame element, the first frame element (1) comprising a pair of first side rods (51), which are substantially longitudinal to the vehicle, and the second frame element (2) comprising a pair of second side rods (52), which are substantially longitudinal to the vehicle, and said side rods (51,52) being disposed to be turnable relative to each other in a vertical plane, and the top mechanism comprising an operating rod (7) arranged to cause said turning of said first side rod relative to the second side rod in connection with the processes of stretching the top mechanism over and of folding it up, characterized in that the first side rod (51) and the second side rod (52) are connected to each other by means of a quadrangular linkage composed of first and second crank levers (8,9) of different lengths, and that the operating rod (7) is turnably pivoted to the first crank lever (8), whereby the first side rod is turnable in a completely controlled manner relative to the second side rod, throughout the turning movement.

2. Top mechanism according to claim 1, characterized in that the quadrangular linkage consists of
   a body component (12) defined by pivot points (10,11) on the crank levers (8,9) on the second side rod (52), the turning of the crank levers of the quadrangular linkage and of the first side rod being arranged relative to this body component;
   the ends of both said first crank lever (8) and said second crank lever (9), being turnably pivoted to the first side rod (51) and to the second side rod (52), respectively; and
   a turning component (15) defined by pivot points (13,14) of the crank levers on the first side rod (51), and that the operating rod (7) is pivoted to the first crank lever (51) at a point located in triangular configuration relative to the pivot points (10,13) of the first crank lever and at a distance (h) from the line connecting these pivot points.

3. Top mechanism according to claim 2, characterized in that the length of the second crank lever (9) is less than the length of the first crank lever (8).

4. Top mechanism according to claim 3, characterized in that the length of the body component (12) is less than the length of the turning component (15), which is less than the length of the second crank lever (9).

5. Top mechanism according to claim 4, characterized in that the quadrangular linkage is a twin pendulum quadrangular linkage.

6. Top mechanism according to claim 3, characterized in that the mechanism comprises stop members (16,17) for limiting the angular movement of the first side rod (51) relative to the second side rod (52) in the extreme positions of the turning.

7. Top mechanism according to claim 6, characterized in that the stop members (16,17) comprise abutment surfaces on the ends which meet each other of the first side rod (51) and the second side rod (52).

8. Top mechanism according to claim 7, characterized in that the shapes of the abutment faces (16,17) are fitted to mate with each other.

9. Top mechanism according to claim 8, characterized in that the mechanism comprises an adjustment member (18) disposed to adjust the position of the abutment faces (16,17) in relation to each other.

10. Top mechanism according to claim 9, characterized in that the abutment faces (16,17) are oblique.

* * * * *